Aug. 18, 1964
H. R. BILLETER ETAL
3,145,064
BRAKE CYLINDER RELEASE VALVES
Filed Oct. 16, 1962
2 Sheets-Sheet 1
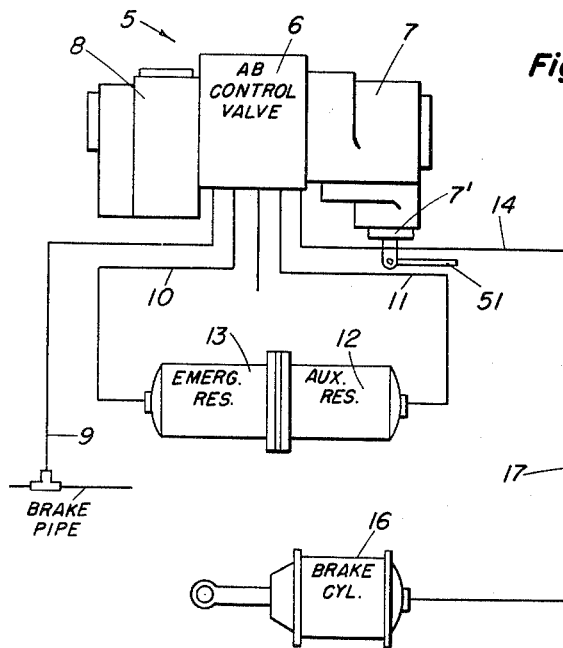
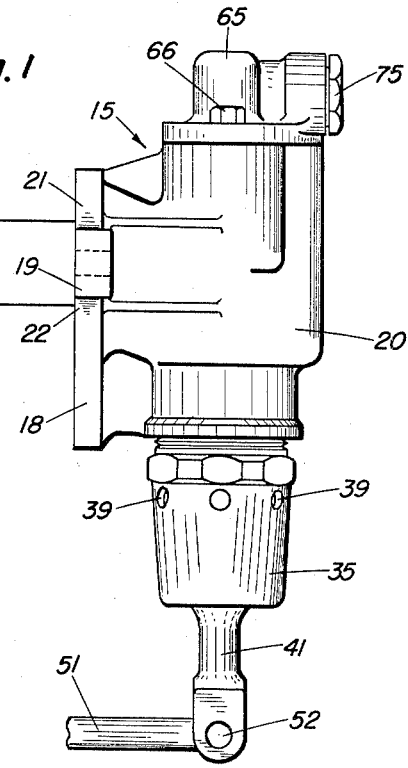
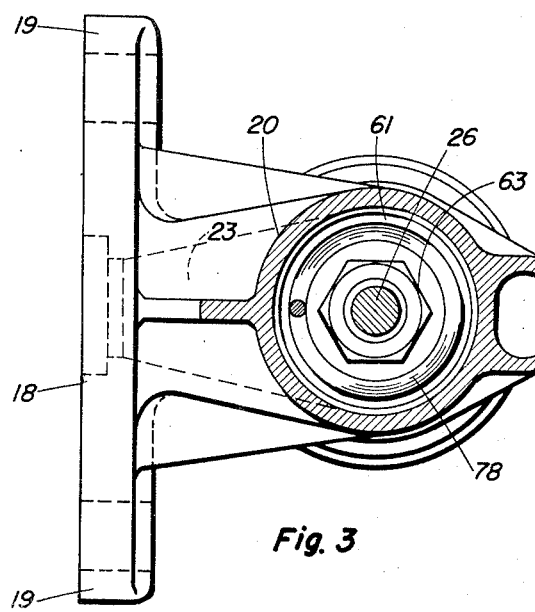
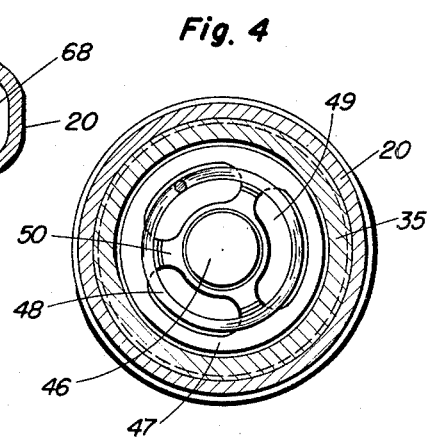
Fig. 1
Fig. 3
Fig. 4
INVENTORS
HENRY R. BILLETER
BY ROBERT E. CAMPBELL
HARRY I. TRAMBLIE
PARKER & CARTER
ATTORNEYS

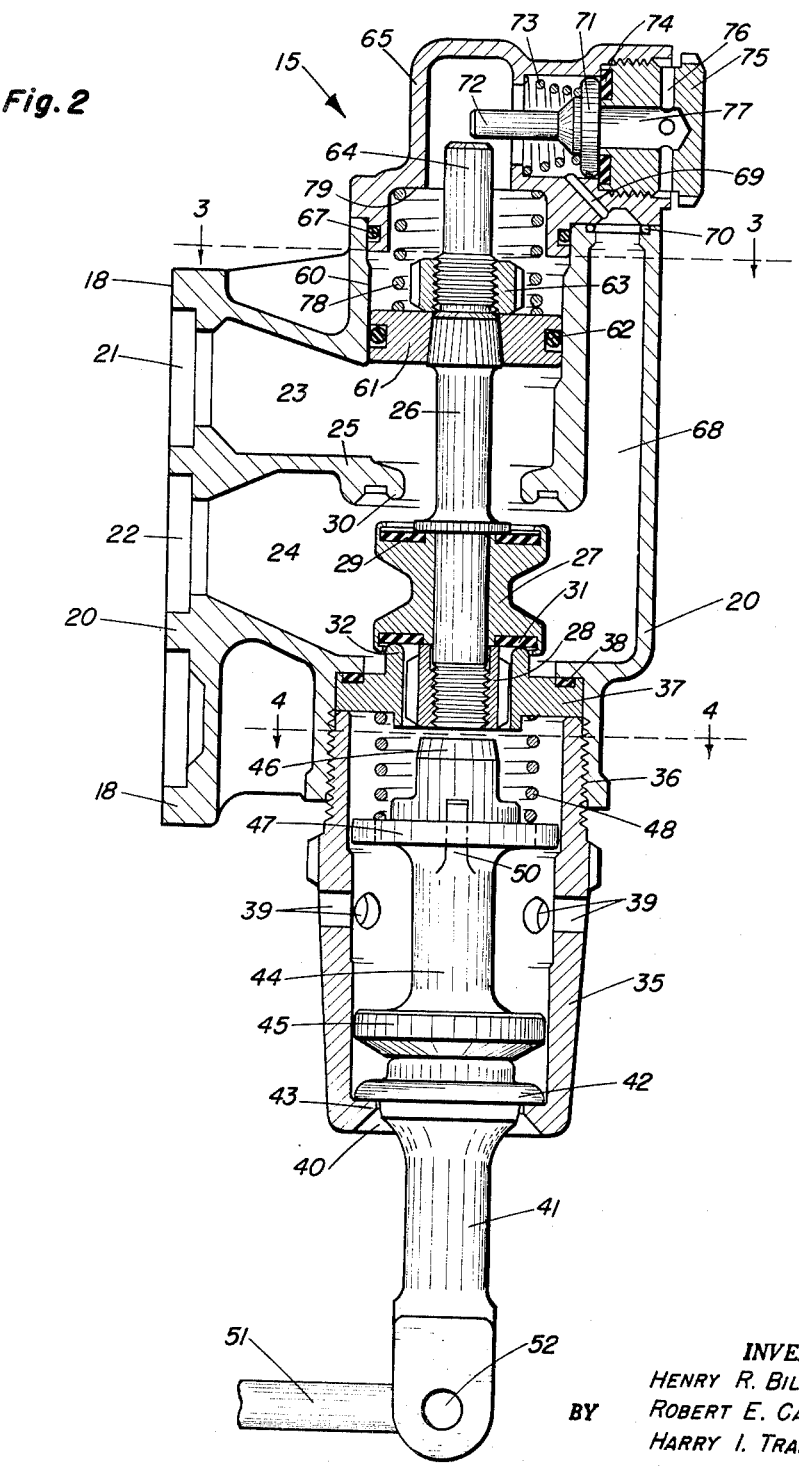

3,145,064
BRAKE CYLINDER RELEASE VALVES
Henry R. Billeter, Deerfield, Robert E. Campbell, Arlington Heights, and Harry I. Tramblie, Western Springs, Ill., assignors to Sloan Valve Company, Chicago, Ill., a corporation of Illinois
Filed Oct. 16, 1962, Ser. No. 230,964
9 Claims. (Cl. 303—69)

This invention relates to brake cylinder release valves for railway cars and in particular, to brake cylinder release valves for connection between the well-known "AB" control valve and the brake cylinder controlling the braking of the car wheels. The purpose of the brake cylinder release valve is to conserve the fluid pressure in the emergency and auxiliary reservoirs while venting the brake cylinder to permit release of the car brakes whenever a car is cut out of a train. The release valve makes it possible for the brakes to be manually released by exhausting the air from the brake cylinder without loss of pressure in the reservoirs so that when a car is again assembled in a train, it is immediately ready to operate without waiting for the build-up of air pressure in all the reservoirs of the cars in the train, thereby conserving fluid pressure, eliminating recharging of the entire brake system, and a saving of time, as well as wear and tear on the equipment.

The principal object of the invention is to provide a new and improved brake cylinder release valve for the foregoing purpose which is reliable in operation, simple in construction, has long service life, and is relatively free from maintenance.

Another object of the invention is to provide a new and improved brake release valve having provisions for preventing unwanted vacillating of the valve member on its seat in normal position caused by fluctuations of brake pressures during light brake applications.

A further object is to provide a brake release valve with air restriction means to prevent any tendency to hold the valve member closed on its seat by air pressures, whenever the valve is manually actuated to release the air pressure from the brake cylinder and thereby release the brakes.

Another object is the provision of a new and improved brake release valve having a relief valve therein actuated upon manual operation of the brake release valve to quickly exhaust the air pressure from the top side of the piston to atmosphere and to enable reservoir air pressure below the piston to hold the brake release valve in brake release position.

A further object is to provide a new and improved brake cylinder release valve having novel features of construction, operation and ease of assembly.

A preferred embodiment of the invention is illustrated in the accompanying drawings in which:

FIG. 1 is a side view of the improved brake cylinder release valve together with diagrammatic illustrations of certain parts of a train brake system;

FIG. 2 is a cross-sectional side view of the improved brake cylinder release valve;

FIG. 3 is a cross-section taken along the line 3—3 of FIG. 2; while

FIG. 4 is a cross-section taken along the line 4—4 of FIG. 2.

As shown in FIG. 1, the brake apparatus is arranged to be mounted on a railroad car and consists of a brake controlling mechanism indicated generally at 5, such as the well-known "AB" control valve having pipe bracket portion 6, a service portion 7, and an emergency portion 8. The usual reservoir bleed valve is indicated at 7¹, together with its operating tie rod. The "AB" control valve is supplied with air pressure through the train brake pipe 9. Leading from the pipe bracket 6 are pipe connections 10 and 11 to the auxiliary reservoir 12 and emergency reservoir 13, respectively. The brake cylinder connection 14 extends from the pipe bracket 6 to the brake cylinder release valve indicated generally at 15. The brake cylinder 16 is connected by pipe 17 to the release valve 15. In the preferred arrangement, the release valve 15 is usually mounted upon the pipe bracket side 6 of the "AB" control valve 5, for example against the flat surface 18 and by means of the ears 19 provided with bolt holes, as seen best in FIG. 3.

Referring to FIG. 2, the brake cylinder release valve 15 comprises a central casing or body portion 20 having a side opening 21 to which the "AB" valve connection 14 is suitably secured and a second opening 22 to which the pipe leading to the brake cylinder 16 is connected. The inlet opening 21 leads into the pressure chamber 23 while the outlet opening 22 leads into the outlet chamber 24. A partition 25 divides the two chambers. The casing 20 is centrally bored to provide for the piston and valve assembly, including supporting stem 26 having the double acting valve member 27 clamped on the lower end of the stem by a nut 28. Valve member 27 is provided with a valve seating washer 29 arranged for seating engagement with upper valve seat 30 in partition 25, and a lower valve seating washer 31 normally in engagement with the lower valve seat 32. The valve seats 30 and 32 are arranged in axial alignment with the double acting valve member 27 between them. At the bottom end of casing 20 there is positioned a socket member 35 which is threaded at its upper end at 36 to the casing 20. A collar 37 carrying valve seat 32 is clamped by socket 35 against the bottom of the casing 20 and a leak-proof sealing washer 38 is arranged on top of collar 37, as shown.

The socket 35 has a series of openings 39 in its sides and an axial opening 40 at its bottom through which a manual operable release lever or rod 41 projects. A collar 42 resting on shoulder 43 retains the lever 41 in depending position from the bottom of the release valve. Release lever 41 is connected to the usual manual operating rod 51 at its lower end 52, so as to enable the rod 51 to tilt the lever 41 when the rod is pulled. Within the socket 35 there is arranged a cylindrical plug 44 with the lower end 45 abutting the end of lever 41 and the upper end 46 being spaced slightly from the bottom end of the stem 26. A collar 47 on plug 44 serves as a support for one end of restoring spring 48, the upper end of which engages the collar 37. Spring 48 normally urges the plug 44 downward in socket 35 and also maintains the lever 41 tensioned in its vertical position as shown. The collar 47 is provided with a series of air passages 49, together with reinforcing ribs 50 between the passages, as best seen in FIG. 4.

The brake cylinder release valve 15 is arranged at its top end with a cylinder 60 in which the piston 61 is adapted to travel. O-ring packing 62 seals the piston in the cylinder and a nut 63 clamps the piston 61 tight onto a shoulder on the stem 26. Stem 26 has a part 64 projecting beyond the end of nut 63. The top of casing 20 is provided with a hollow cover 65 secured thereto as by bolts 66 and sealed by O-ring 67 in the cylinder 60. An air passage 68 formed in body 20 extends upwardly from chamber 24 into the cover 65 and is connected to a restricted passage 69 leading into the interior of hollow cover 65. The cover 65 is sealed to the end of passage 68 by an O-ring 70.

The hollow cover 65 supports a relief valve member 71 having a stem 72 extending laterally into close proximity of the upper end of stem 64 whereby stem 72 is adapted to be tilted whenever stem end 64 is projected in an upward direction. Spring 73 around stem 72 and under valve member 71 serves to restore the relief valve and stem to normal position after each operation. The valve seat for the relief valve 71 is indicated at 74 and is supported in a plug 75 threaded longitudinally into the cover 65. Perpendicular passages 76 and horizontal passage 77 lead to atmosphere from the closed side of the relief valve 71.

For the purpose of restoring the brake cylinder release valve stem assembly, a relatively heavy spring 78 is arranged in cylinder 60 extending between the top of piston 61 and a shoulder 79 formed in cover 65.

In the operation of the device, assume the brake equipment shown in FIG. 1 to be fully charged with air under pressure, the AB control valve 5 to be in brake release position, and the brake cylinder release valve 15 to be in its normal or service position, as shown in FIG. 2. Under these conditions and with the train under way, the brake cylinder 16 will be connected directly to the AB control valve by way of pipe 17, port 22 and chamber 24, of the brake cylinder release valve 15, through valve seat 30, chamber 23, port 21 and pipe 14 to the pipe bracket 6 of the AB control valve. The passage for air between the brake cylinder 16 and the AB valve 5 is thereby complete so the engineer is able to control the train and apply the brakes in the usual manner, the same as if the brake cylinder release valve were not interposed. The brake cylinder release valve is held seated in the normal running position by virtue of the presence of air pressure in chambers 23 and 24, the differential pressure on top of the valve member 27 and atmosphere on the bottom, together with the downward tension exerted by restoring spring 78. These forces are sufficient to hold the valve member 27 closed down tight on its lower seat 32 under the foregoing conditions. Communication between the AB control valve and the brake cylinder is thereby maintained and the brakes can be operated in the normal manner.

Under the above circumstances, changes in pressure of the air in the train pipe brought about by the engineer so as to cause the AB control valve to control brake operation, do not in any way upset the position of the release valve. The release valve maintains a clear passage for air between the AB control valve and the brake cylinder. When the air pressure is released entirely from the train brake pipe 9, as when a car is cut out of a train, the release valve remains in its set position, permitting continued brake holding application by the AB control valve of the air under pressure in the reservoirs.

When it is desired to bleed off the air and release the brakes on the switched car, the brakeman manually actuates lever 51 to tilt the handle 41 in any chosen direction to force the plug 44 upward against the tension of restoring spring 48 and the AB pressure in chamber 23. The end 46 of plug 44 contacts the lower end of stem 26, resulting in the forceful upward movement of the stem 26 and the opening of the air release seat 32 and closing of holding seat 30 by valve member 27. This action exhausts the air pressure immediately from the brake cylinder 16 via chamber 24, release seat 32, downward through the openings 49 in plug disc 47 and to atmosphere through the openings 39 in socket 35. The brakes are thereby released in the usual manner.

As a further result of the closing of valve seat 30 by valve member 27, the passage 24 to the brake cylinder 16 from the AB valve is completely closed and escape of air pressure through seat 30 from the emergency and auxiliary reservoirs 12 and 13, is thereby prevented. There is therefore no possibility of air being lost from the reservoirs while the car is not connected up with the train, and when the car is again assembled in a train, it is ready to operate without waiting for build up of air pressure in all the reservoirs.

Returning again to when the valve member 27 was shifted upward by the handle 41 from valve seat 32 to seat 30, during this movement there will be a slight interval before seat 30 is closed, when a small amount of AB air pressure from chamber 23 will also be exhausted to atmosphere downward through the opening 40, and in order not to interfere with the smooth positive upward movement of the stem 26, together with valve member 27 and piston 61, the restricted passage 69 is provided. This restricted passage during this movement prevents the air pressure from chamber 23 from continuing to enter the chamber above piston 61 at too rapid a rate at this particular instant. Continued entry at a rapid rate at this instant would have a tendency, in cooperation with spring 78, to hold the valve member 27 down on its seat against the action of the rod 41.

Another purpose of the restricted passage 69 is to insure that during the time that brake application is being made by the AB valve, the air pressures are fluctuating within the chambers 23 and 24 of the brake release valve, the valve member 27 would not be disturbed or "jiggled" on its seat 32. The restricted passage 69 prevents too rapid escape of pressure from above the piston 6 during these conditions and the valve remains seated and stable in its closed position.

Again as a further result of the upward movement of valve stem 26 and a short time after the valve seat 32 is opened, the upper end 64 of the stem 26 contacts the relief valve stem 72 and tilts it upward. The tilting of relief valve 71 off its seat 74 permits a complete and rapid exhaustion of the air pressure from above the piston 61, through relief valve seat 74 and passages 76 and 77 to the atmosphere. When this occurs, the pressure on top of piston 61 being completely released, the valve member 27 is quickly and smoothly closed upon its upper seat 30 and remains in this set position as long as the car is disconnected from the train. The valve member 27 and stem 26 remain held in the foregoing upward position even after the handle 41 is released and restored by spring 48, because the AB pressure now present in chamber 23 on the underside of piston 61 is present over a greater pressure area than that on top of the valve member 29 within the area of its closed seat 30. Thus the pressure from the AB valve holds the release valve in the brake cylinder release and reservoir closing position against the tension of spring 78. With the brakes released, the car can then be moved but no further air is lost through the AB valve and further manipulation of the handle 41 can have no effect on the brake release valve. The reservoirs 12 and 13 retain their pressures while the brake cylinder 16 is completely exhausted so the brakes are in released position.

From the foregoing arrangement and cooperation between the relief valve 61 and restricted passage 69, a more positive and reliable actuation of the valve member 27 is brought about to insure that it can be smoothly actuated to its uppermost position, and once moved thereto, will reliably remain in this closed position under all possible operating conditions so that loss of air pressure from the reservoirs is prevented.

When a car is replaced in a train and pipe pressures are restored, the AB control valve assumes its release position. This reduces the reservoir pressure in chamber 23, thereby permitting the restoring spring 78 to exert its stored energy against the top of piston 61, restoring the stem 26 and valve member 27 downward to normal position. As a result, the valve seat 32 is now closed while valve seat 30 is open, permitting a clear passage between the chambers 23 and 24, so that the AB control valve again has control of air pressures to the brake cylinder 16 for brake application. The brake release valve is now held in the above position by spring 78, and any further action by the AB valve in its operation will have no effect upon the position of the brake release valve.

The invention is applicable for use with a common actuating rod connecting together the brake cylinder release valve 15 and the reservoir bleed or duplex valve 7[1]. The common actuating rod 51, shown in FIG. 1, can be hand operated by the brakeman to fully deplete the emergency reservoir 13 and the auxiliary reservoir 12, as well as the brake cylinder 16 under certain conditions. However, if the brakeman desires to release the car brakes only and maintain the reservoirs almost fully charged, he gives only a momentary pull on the rod 51 which "resets" the brake cylinder release valve with practically no loss of air from either the auxiliary or emergency reservoirs, since the duplex valve 7¹ will immediately reclose when the pull rod 51 is released. Under these conditions, the piston 61 is snapped upwardly to immediately trip the relief valve 71 and exhaust the air pressure from the top of the piston which occurs much more rapidly than the air pressure can exhaust from chambers 23 and 24 of the release valve. The relief valve 71 exhausts the pressure from the top of the piston very rapidly to maintain the valve seat 30 closed during the momentary drop in pressure in chamber 23 as the reservoirs are being slightly depleted. This action maintains the differential across the piston against the action of spring 78.

With separate actuating rods for the duplex valve and the brake cylinder valve, the auxiliary reservoir is vented first before the brake cylinder is vented to prevent unintentional release of the brake cylinder pressure under unusual operating conditions and to prevent interference of the brake release valve with normal brake equipment functions if it is inadvertently actuated during light braking applications while the train is in motion.

The spring tension of restoring spring 78 is such that if the brake release valve is tripped when the brake reservoir pressure in chamber 23 is at or below 30 p.s.i. the brake release valve will immediately reset because the restoring spring 78 at this low pressure is effective to cause such resetting. At pressures of 40 p.s.i. and above, the brake release valve can be tripped and remain in that position because the spring 78 is not strong enough to overcome the AB pressures present below the piston 61.

The actuating rod for the brake cylinder valve is connected to the duplex or retainer valve and both operated together so as to bleed the air reservoirs in the AB control valve and reset the brake release valve whenever the pressure in the reservoir falls below the brake pipe pressure. This is desirable in the event the air reservoirs are overcharged or the brakes have become locked.

It is therefore seen that with the brake cylinder release valve constructed according to the present invention, a number of desirable advantages are secured. The time necessary to bleed and then to recharge the brake system of a train is greatly reduced. The valve when actuated automatically exhausts only the pressure in the brake cylinder to the atmosphere, and at the same time conserves the air in the reservoirs. Both the time loss in manually bleeding and then recharging each individual car is eliminated while the air usually lost in manual bleeding is conserved.

The preferred embodiment has been described in some detail, however the invention is not to be limited to this particular embodiment but only to the scope of the appended claims.

What is claimed is:

1. In a brake cylinder release valve, a casing having a connection with a brake control valve and a connection with a brake cylinder, a valve stem in said casing having a double acting valve member on one end and a piston slidable in said casing on the other end, a valve seat in said casing opened by said valve member to permit free passage of air pressure from said brake control valve to said brake cylinder, a spring on said valve stem biasing said valve member in said open position, manual operated means in said casing for actuating said valve stem to move said valve member to close on said valve seat and disconnect the air pressure from said brake cylinder while retaining the air pressure from said brake control valve, said retained air pressure being effective on one side of said piston opposed to said spring to hold said valve stem and valve member in actuated position after said manual operating means is released, a second valve seat normally closed by said valve member and opened upon movement of said valve member to exhaust the air pressure to atmosphere from said brake cylinder, a relief valve in said casing having a valve seat controlling the exhaust of air pressure from the other side of said piston to atmosphere, said relief valve having a horizontally disposed stem arranged opposite the upper end of said main valve stem, the operation of said main valve stem being effective to contact said relief valve stem and tilt the same to open said relief valve as said piston is moved from one of its seats to the other, and spring means on said relief valve stem for restoring the same.

2. In a brake cylinder release valve having a casing connected between a brake control valve and a brake cylinder, a main valve stem having a double acting valve member on one end and a piston on the other end, a pair of spaced apart valve seats adapted to be alternately closed and opened by said double acting valve member to control air pressures between said brake control valve and said brake cylinder, manual operated means adapted to engage one end of said valve stem to shift said double acting valve member from one of said valve seats to the other, said main valve stem being vertically disposed for operation by said manual operated means, spring means for restoring said valve stem and shifting said double acting valve member back to said first valve seat, said piston being at times subject to air pressures on the bottom and top sides thereof, a relief valve horizontally disposed in said casing having an operating stem disposed at right angles and opposite the upper end of said main valve stem, said relief valve member closing a valve seat to atmosphere adapted to be opened by the main valve stem engaging said relief valve stem, spring means for restoring said relief valve member after said main valve stem is restored, said relief valve member exhausting air pressure from the top of said piston when said main valve stem is manually actuated.

3. In a brake cylinder release valve, a casing having a connection with a brake control valve and a brake cylinder, a main valve stem vertically disposed in said casing and having a valve member on one end and a piston on the other end, a valve seat for said valve member, said valve member controlling passage of air pressure between said brake control valve and said brake cylinder, manually operated means on the bottom of said casing adapted to actuate said main valve stem and move said valve member to close said valve seat, said piston subjected to air pressures on the top and bottom sides thereof from said brake control valve, and a relief valve for releasing air pressure from the top of said piston when said main valve stem is actuated, said relief valve being horizontally disposed and having a stem opposed to the end of said main valve stem and being tilted thereby, a relief valve member on said relief valve stem, a seat in said casing for said relief valve member, and spring means on said main valve stem and said relief valve stem for restoring the same.

4. In a brake cylinder release valve, a casing having an air pressure connection leading to a brake control valve and another connection to a brake cylinder, a main valve stem in said casing having a double acting valve member on one end thereof and a piston on the other end, opposed valve seats for said double acting valve member, the upper one of said valve seats controlling passage of air pressure from said brake control valve to said brake cylinder and the lower one of said valve seats controlling release of air pressure from said brake cylinder to atmosphere, a manually operated lever in said casing adapted to contact the bottom end of said main valve stem to actuate it upward and shift said double acting valve member from its lower seat to its upper seat, said piston being exposed to air pressure on its underside from said brake control valve when said valve member is seated on said upper seat to hold the same seated thereon, a spring on said valve stem for restoring said valve stem and valve member when the air pressure below said piston is reduced, by said brake control valve, said casing having a main air passage extending between both of said valve seats to the top side of said piston to balance the air pressure on both sides of said piston when the double acting valve member is seated on its lower seat, said casing having a restricted passage connecting said main air passage with the top side of said piston, said restricted passage preventing air pressure from being effective to hold said piston downward during the time said double acting valve member is being moved upward and then closed upon its upper seat, and a relief valve on the top end of said casing actuated by the upward movement of said valve stem for exhausting the air pressure from the top of said piston to atmosphere so that after said double acting valve member is closed upon its upper valve seat air pressure below said piston will be effective to continue to hold the same in its upward position.

5. In a brake cylinder release valve, a casing having an air pressure connection leading to a brake control valve and another connection to a brake cylinder, a main valve stem in said casing having a double acting valve member on one end thereof and a piston on the other end, opposed valve seats for said double acting valve member, the upper one of said valve seats controlling passage of air pressure from said brake control valve to said brake cylinder and the lower one of said valve seats controlling release of air pressure from said brake cylinder to atmosphere, a manually operated lever in said casing adapted to contact the bottom end of said main valve stem to actuate it upward and shift said double acting valve member from its lower seat to its upper seat, said piston being exposed to air pressure on its underside from said brake control valve when said valve member is seated on said upper seat to hold the same seated thereon, a spring on said valve stem for restoring said valve stem and valve member when the air pressure below said piston is reduced, by said brake control valve, said casing having a main air passage extending between both of said valve seats to the top side of said piston to balance the air pressure on both sides of said piston when the double acting valve member is seated on its lower seat, said casing having a restricted passage connecting said main air passage with the top side of said piston, said restricted passage preventing air pressure from being effective to hold said piston downward during the time said double acting valve member is being moved upward and then closed upon its upper seat, and a relieve valve on the top end of said casing actuated by the upward movement of said valve stem for exhausting the air pressure from the top of said piston to atmosphere so that after said double acting valve member is closed upon its upper valve seat air pressure below said piston will be effective to continue to hold the same in its upward position, said relieve valve having an operating stem spaced slightly from the end of said valve stem and adapted to be tilted thereby, and spring means for restoring said relief valve to close the atmosphere opening after said main valve stem is moved downward.

6. In a brake cylinder release valve for controlling air pressure between a brake control valve and a brake cylinder, a casing having a main valve stem vertically disposed therein with a double acting valve member at one end and a piston on the other end, manual means for actuating said main valve stem upwardly to shift said valve member from one seat to another, spring means for restoring said main valve stem, means in said casing for balancing air pressures from said brake control valve to both sides of said piston, and means for releasing air pressure from one side of said piston when said valve stem is manually actuated, said last means comprising a relief valve horizontally disposed and having a relief valve stem arranged opposite the upper end of said main valve stem in operative relation thereto and adapted to be tilted thereby, said relief valve stem having a relief valve member normally closed upon a relief valve seat and controlling an air passage to the atmosphere, a spring for restoring said relief valve stem, and means for removably supporting said relief valve in said casing.

7. In a brake cylinder release valve, a casing having a piston controllable under certain operating conditions, a vertically disposed main valve stem supporting said piston for movement in the upper end of said casing, a valve member supported on said valve stem on the lower end of said casing, means for moving said valve stem in a vertical direction in said casing to open said valve member from its associated valve seat, a relief valve in said casing having a horizontally disposed valve stem arranged opposite the upper end of said main valve stem and above said piston, a spring on said relief valve stem normally holding the same in a horizontal position and closing the relief valve on its seat, said main valve stem effective when moved upwardly to contact said relief valve stem to tilt the same against the tension of its spring and thereby open said relief valve from its seat, the opening of said relief valve relieving pressure from the top side of said piston to the atmosphere.

8. The arrangement claimed in claim 7 in which the relief valve comprises an assembled structure insertable as a unit in said casing and in which there are air openings in said unit extending from below the valve seat to the atmosphere outside the casing.

9. In a brake cylinder release valve, a casing having a piston controllable under certain operating conditions, a longitudinally disposed main valve stem supporting said piston for movement in one end of said casing, a valve member supported on said valve stem on the opposite end of said casing, means for moving said valve stem in one direction in said casing to open said valve member from its associated valve seat, a relief valve in said casing having a laterally disposed valve stem arranged opposite one end of said main valve stem and adjacent said piston, a spring on said relief valve stem normally holding the same in a lateral position and closing the relief valve on its seat, said main valve stem effective when moved in said one direction to contact said relief valve stem to tilt the same against the tension of its spring and thereby open said relief valve from its seat, the opening of said relief valve relieving pressure from one side of said piston to the atmosphere.

References Cited in the file of this patent
UNITED STATES PATENTS

| | | |
|---|---|---|
| 2,508,206 | Whitney | May 16, 1950 |
| 2,650,138 | Klein | Aug. 25, 1953 |
| 2,735,726 | Klingler et al. | Feb. 21, 1956 |
| 2,886,377 | Martin | May 12, 1959 |
| 3,042,457 | Morgan | July 3, 1962 |